United States Patent
Jestice et al.

(10) Patent No.: US 10,732,068 B2
(45) Date of Patent: Aug. 4, 2020

(54) METHOD AND SYSTEM FOR DETECTING LEAKAGE IN FLUID DISTRIBUTION NETWORKS

(71) Applicant: Patrick Patrick Reilly, Aptos, CA (US)

(72) Inventors: Ian Jestice, Naples, CA (US); Forrest Sass, Pleasanton, CA (US)

( * ) Notice: Subject to any disclaimer, the term of this patent is extended or adjusted under 35 U.S.C. 154(b) by 40 days.

(21) Appl. No.: 15/657,111

(22) Filed: Jul. 22, 2017

(65) Prior Publication Data

US 2019/0025151 A1 Jan. 24, 2019

(51) Int. Cl.
| | |
|---|---|
| G01M 3/26 | (2006.01) |
| G01M 3/28 | (2006.01) |
| E03B 7/07 | (2006.01) |
| G08B 7/06 | (2006.01) |
| E03B 7/00 | (2006.01) |

(52) U.S. Cl.
CPC .............. *G01M 3/28* (2013.01); *E03B 7/003* (2013.01); *E03B 7/071* (2013.01); *G01M 3/2815* (2013.01); *G08B 7/06* (2013.01)

(58) Field of Classification Search
CPC ... E03B 7/00; E03B 7/07; E03B 7/071; E03B 7/08; G01M 3/00; G01M 3/26; G01M 3/28; G08B 7/06
See application file for complete search history.

(56) References Cited

U.S. PATENT DOCUMENTS

| | | | |
|---|---|---|---|
| 4,518,955 A | 5/1985 | Meyer | |
| 4,705,060 A | 11/1987 | Goulbourne | |
| 4,911,200 A | 3/1990 | Ben Arie | |
| 5,004,014 A | 4/1991 | Bender | |
| 5,046,519 A | 9/1991 | Stenstrom | |
| 5,062,442 A | 11/1991 | Stenstrom | |
| 5,568,825 A * | 10/1996 | Faulk | E03B 7/071 137/624.11 |
| 5,708,195 A | 1/1998 | Kurisu | |
| 5,913,236 A | 6/1999 | Wodeslavsky | |
| 5,918,617 A | 7/1999 | Garth | |

(Continued)

FOREIGN PATENT DOCUMENTS

| | | |
|---|---|---|
| AU | 2006257712 | 6/2006 |
| GB | 2276656 A | 10/1994 |

(Continued)

*Primary Examiner* — Nguyen Q. Ha
(74) *Attorney, Agent, or Firm* — Patrick T. Reilly

(57) ABSTRACT

A system and method for determining a leakage condition of a fluid distribution system in view of a failure to detect a no flow condition at a fluid access point of the fluid distribution system for a pre-established time duration within a pre-established time period longer than the pre-established time duration. The system includes a sensor and optionally a valve, a reporting module and/or a control means. The valve is responsive to commands directing a blockage of flow of fluid. The reporting module may include an alerting module, a messaging module, a cellular phone, and/or an electronic communications network. The control means is coupled with the valve and is enabled to direct the controlling valve to block fluid flow. The control means may be integrated with elements of the reporting module. The leakage condition may be related to a leakage in an inflow direction or alternately in an outflow direction.

20 Claims, 12 Drawing Sheets

(56) References Cited

U.S. PATENT DOCUMENTS

| | | |
|---|---|---|
| 5,967,171 A | 10/1999 | Dwyer, Jr. |
| 6,119,720 A | 9/2000 | Isaacson, Jr. |
| 6,237,618 B1 | 5/2001 | Kushner |
| 6,253,785 B1 | 11/2001 | Shumake, Jr. |
| 6,321,773 B1 | 11/2001 | Hire |
| 6,369,714 B2 | 4/2002 | Walter |
| 6,374,846 B1 | 4/2002 | DeSmet |
| 6,481,634 B1 | 11/2002 | Zosimadis |
| 6,491,062 B1 | 12/2002 | Croft |
| 6,520,003 B1 | 2/2003 | Fox |
| 6,523,562 B2 | 2/2003 | Harper |
| 6,532,979 B1 | 3/2003 | Richter |
| 6,535,827 B1 | 3/2003 | Lestina |
| 6,543,479 B2 | 4/2003 | Coffey |
| 6,612,323 B1 | 9/2003 | Horne |
| 6,691,724 B2 | 2/2004 | Ford |
| 6,753,554 B1 | 6/2004 | Gomes |
| 7,360,413 B2 | 4/2008 | Jeffries |
| 2002/0148515 A1 | 10/2002 | Coffey |
| 2003/0033867 A1 | 2/2003 | Posey |
| 2004/0046671 A1 | 3/2004 | Ninberg |
| 2004/0134545 A1 | 7/2004 | Ford |
| 2004/0206405 A1 | 10/2004 | Smith |
| 2011/0035063 A1 | 2/2011 | Palayur |
| 2016/0076909 A1 * | 3/2016 | Klicpera ................. G06Q 50/06 73/198 |
| 2018/0313714 A1 * | 11/2018 | Bailey ................... G01M 3/002 |

FOREIGN PATENT DOCUMENTS

| | | | |
|---|---|---|---|
| GB | 2360365 | 9/2001 | |
| JP | S5881285 A | 5/1983 | |
| JP | H07317113 A | 12/1995 | |
| JP | H08334430 A | 12/1996 | |
| JP | H11158949 A | 6/1999 | |
| WO | WO-2016124931 A1 * | 8/2016 | ............. G01M 3/26 |

\* cited by examiner

DATA COLLECTED AT WATER INPUT POINT

MTU 46474029, Port 1
Readings for the past 90
Readings In 1 Cu. Ft.
Channel Reporting Cu. Ft.
Time Reading

901 ↗

| DATE | TIME | COUNTER | DATA POINTS |
|---|---|---|---|
| 4/18/2017 | 1:00:00 (PDT) | 1575.00 | 2AH |
| 4/18/2017 | 00:00:00 (PDT) | 1574.24 | 2AG |
| 4/17/2017 | 23:00:00 (PDT) | 1574.19 | 2AF |
| 4/17/2017 | 22:00:00 (PDT) | 1572.74 | 2AE |
| 4/17/2017 | 21:00:00 (PDT) | 1571.48 | 2AD |
| 4/17/2017 | 20:00:00 (PDT) | 1571.2 | 2AC |
| 4/17/2017 | 19:00:00 (PDT) | 1570.64 | 2AB |
| 4/17/2017 | 18:00:00 (PDT) | 1570.66 | 2AA |
| 4/17/2017 | 17:00:00 (PDT) | 1569.69 | 2Z |
| 4/17/2017 | 16:00:00 (PDT) | 1569.64 | 2Y |
| 4/17/2017 | 15:00:00 (PDT) | 1569.29 | 2X |
| 4/17/2017 | 14:00:00 (PDT) | 1567.94 | 2W |
| 4/17/2017 | 13:00:00 (PDT) | 1567.74 | 2V |
| 4/17/2017 | 12:00:00 (PDT) | 1567.36 | 2U |
| 4/17/2017 | 11:00:00 (PDT) | 1566.28 | 2T |
| 4/17/2017 | 10:00:00 (PDT) | 1565.31 | 2S |
| 4/17/2017 | 9:00:00 (PDT) | 1564.05 | 2R |
| 4/17/2017 | 8:00:00 (PDT) | 1562.55 | 2Q |
| 4/17/2017 | 7:00:00 (PDT) | 1561.08 | 2P |
| 4/17/2017 | 6:00:00 (PDT) | 1560.79 | 2O |
| 4/17/2017 | 5:00:00 (PDT) | 1560.58 | 2N |
| 4/17/2017 | 4:00:00 (PDT) | 1560.58 | 2M |
| 4/17/2017 | 3:00:00 (PDT) | 1560.58 | 2L |
| 4/17/2017 | 2:00:00 (PDT) | 1560.58 | 2K |
| 4/17/2017 | 1:00:00 (PDT) | 1560.58 | 2J |
| 4/17/2017 | 0:00:00 (PDT) | 1560.58 | 2I |
| 4/16/2017 | 23:00:00 (PDT) | 1560.58 | 2H |
| 4/16/2017 | 22:00:00 (PDT) | 1560.58 | 2G |
| 4/16/2017 | 21:00:00 (PDT) | 1559.79 | 2F |
| 4/16/2017 | 20:00:00 (PDT) | 1558.05 | 2E |
| 4/16/2017 | 19:00:00 (PDT) | 1556.59 | 2D |
| 4/16/2017 | 18:00:00 (PDT) | 1556.18 | 2C |
| 4/16/2017 | 17:00:00 (PDT) | 1556.15 | 2B |
| 4/16/2017 | 16:00:00 (PDT) | 1555.91 | 2A |

TIME WINDOW T2
TIME PERIOD T1

FIGURE 9

AMSG

| ADDRESSEE.ADDR | SENDER.ADDR | LEAK.FLG | DATA |
|---|---|---|---|

FIGURE 12

METHOD AND SYSTEM FOR DETECTING LEAKAGE IN FLUID DISTRIBUTION NETWORKS

FIELD OF THE INVENTION

The method of the present invention relates to systems and methods for detecting leaks within fluid distribution systems. More particularly, the present invention relates to methods of determining the presence of a leak condition of a fluid distribution system on the basis of time-related detections of alternative conditions of flow of fluid and no flow of fluid through a fluid access point of a fluid distribution system.

BACKGROUND OF THE INVENTION

The subject matter discussed in the background section should not be assumed to be prior art merely as a result of its mention in the background section. Similarly, a problem mentioned in the background section, or associated with the subject matter of the background section, should not be assumed to have been previously recognized in the prior art. The subject matter in the background section merely represents different approaches, which in and of themselves, may also be inventions.

The prevention of wasteful fluid and water leakage from fluid distribution systems in a wide variety of domestic, commercial and governmental facilities such as apartments, factories, condominiums, and office buildings offers dramatic environmental and economic benefits. For example, the installation of water meters has had a powerful effect on lowering water consumption rates. However, delivering the benefits of fluid leak detection, including water and water-based solutions, in these diverse environments has been an elusive endeavor.

More particularly, the prior art fails to optimally provide a system and a method of leak detection that is adaptable, in certain embodiments, to utilize prior art fluid and water flow detection means and in other embodiments to utilize more complex, expensive and inventive equipment.

There continues to exist a current and a long-felt need for a low-cost, easily configurable, widely applicable system and method for quickly, accurately identifying and optionally reporting leakage of water. Optionally this may include other fluids in facilities having a fluid distribution system.

SUMMARY AND OBJECTS OF THE INVENTION

Towards these objects and other objects that will be made obvious in light of the present disclosure, a method and system for the detection of leaks of a domestic, industrial, commercial, governmental or public fluid distribution system are disclosed. A first preferred embodiment of the present invention comprises a fluid flow sensor that is positioned to detect fluid flow at an access point of a fluid distribution system. It is understood that an access point of a fluid distribution system is an aperture of the fluid distribution system, through which fluid asynchronously and/or periodically flows into, out of, or both into and out of.

According to the method of the present invention (hereinafter, "the invented method") fluid flow is continuously observed at the access point for a specified time window of time. When fluid flow is not detected at the access point during a specified first time duration (hereinafter, "T1") which is equal to or less than a certain second time duration (hereinafter, "T2"), the invented method teaches that the selected fluid distribution system does not have a leak condition. Alternatively, if observation of the access point of the selected fluid distribution system indicates that flow of fluid through the access point is not detected to cease for a length of time at least as long as the preselected time duration value, then the invented method teaches that the relevant fluid distribution system has a potential leak condition. It is understood that certain fluid distribution systems may be intentionally operated so that that the preselected time duration of no flow T1 is not achieved in general, or not achieved during the course of fluid flow observation of one or more second time durations T2; in such cases the invented method may indicate a false positive of a potential leak.

Fluid distribution systems of domestic structures, such as single-family dwellings, provide a common area of valuable application of the invented method. It is understood that in most homes most residents typically sleep during some portion of the 24-hour daily cycle. When the residents of a single family dwelling have a shared sleep period, the invented method teaches that, unless there is a leak within the fluid distribution system of the single family dwelling, observations at a sole fluid input access of the fluid distribution system of the single family dwelling would detect no deviation from a no flow state during at least much of the resident or residents sleeping time. Alternatively, when observation of the sole input access point indicates that fluid flow into the selected single family dwelling does not cease for at least a certain time duration, i.e., fluid flow continues even when the residents are all asleep, the invented method teaches that the fluid distribution system of the single family dwelling has a leak fault condition.

It is understood that fluid distribution systems of commercial, governmental and public structures, e.g., buildings, provide additional alternate opportunities of applications of the invented method.

A first preferred embodiment of the invented method is implemented by automatically detecting durations of no flow states and to automatically monitor fluid flow indications and/or to issue a fault condition warning upon failure to detect a no flow state for the prespecified time duration T1 within and occurring during an instantiation of the longer time window T2

In certain other alternate preferred embodiments of the invented method, the time duration T1 and/or the time window T2 are adjustable by a user, programmable and/or reprogrammable via an electronics communications network, and/or programmable and/or reprogrammable by a local user interface.

In certain other alternate embodiments of the invented method are implemented by observing or analyzing flow detection data generated by prior art systems and means. Prior art systems and/or means that can indicate the duration of a no flow state of a selected fluid access point of a fluid distribution system within a larger time period are suitable for certain applications of a second alternate preferred embodiment of the invented method A human analyst or computer program may apply the first method in reviewing a history of flow and no flow indications generated by a suitable prior art system and/or means in searching for an indication of a no flow state for a time duration of at least a prespecified and/or configurable time duration T1 within a prespecified, and/or configurable, continuous time duration T2 (hereinafter, "time window T2").

Certain still alternate preferred embodiments of the present invention are adapted to monitor for no flow states of any fluid distribution system.

Certain other alternate preferred embodiments of the present invention are enabled to, upon a failure to detect no flow for the specified duration of the fluid distribution system, optionally (a.) shut down water flow into and/or out of the fluid distribution system, and/or (b.) indicate the failure of detection of a no flow of the specified duration with an audible, visual or electronic alarm.

Certain yet alternate preferred embodiments of the present invention include one or more of the following elements: (a.) an alerting device for issuing an alert when a fault condition is detected by the failure to detect a no flow state for the prespecified and/or configurable time duration T1 during the prespecified and/or configurable time window T2; (b.) a messaging device for issuing a message when a fault condition is detected by the failure to detect a no flow state for the prespecified and/or configurable time duration T1 during the prespecified and/or configurable time window T2; (c.) a communications device that sends alerts and/or messages via electronic communications technology, e.g., in singularity or combination, a telephony system, a cellular telephony device, a cellular telephony network, an electronic communications network, and/or a wireless electronic communications network; (d.) an alert signaling device for issuing an alert of a leak condition by a sound energy output, a light energy output, a radio wave output, and/or electronic communications network signals; (e.) a messaging device for reporting a leak condition by a sound energy output, a light energy output, a radio wave output, and/or an electronic communications network messaging regime;(f.) a device for issuing a leak condition alert or a message comprising or within an electronic text message consisting of an email, an SMS text message and/or a digitized electronic text message; (g.) an electromechanical means, a hydraulic actuator and/or a pneumatic actuator adapted to controllably impede or halt fluid flow at one or more points within a fluid distribution network; (h.) means to controllably impede or halt fluid flow at one or more points within a fluid distribution network; and/or (i.) means to remotely command an impedance or cessation of fluid flow at one or more points of a fluid distribution system.

Certain various alternate preferred embodiments of the invented method comprises one or more of the following aspects: (a.) issuing an alert when a fault condition of a failure to detect a no flow state for the prespecified and/or configurable time duration T1 during the prespecified and/or configurable time window T2 is determined; (b.) issue a message bearing information indicating that a fault condition of failure to detect a no flow state for the prespecified and/or configurable time duration T1 during the prespecified and/or configurable time window T2 is determined; (c.) communicating alerts and/or messages via electronic communications technology by means of, in singularity or combination, a telephony system, a cellular telephony device, a cellular telephony network, an electronic communications network, and/or a wireless electronic communications network; (d.) issuing an alert of a fault condition finding by means of a sound energy output, a light energy output, a radio wave output, and/or electronic communications network signals; (e.) issuing a message reporting a finding of a fault condition by means of a sound energy output, a light energy output, a radio wave output, and/or an electronic communications network messaging regime; (f.) communicating an alert or a message comprising or within an electronic text message consisting of an email, an SMS text message and/or a digitized electronic text message; (g.) controllably impeding or halting fluid flow at at least one point within a fluid distribution network; and/or (h.) remotely directing or commanding an impedance or cessation of fluid flow at at least one point of a fluid distribution system.

Within most water distribution systems, water usage is cyclical and has a predictable period. Within this cyclical period there are usually recognizable times when there is likely no water usage. These periods are known as null usage periods. For example, in most household water systems, usage cycles on a 24-hour period. Typically, at night, the anticipated null usage period would be from 11pm until 5am. In this example the anticipated null usage period would be 6 hours.

A person skilled in the art would recognize that different water distribution systems could have different cyclical periods and different anticipated null usage periods. The cyclical periods and no flow periods can be set according to the system being monitored. Within the null usage period, a person skilled in the art would expect time periods of no flow in a well maintained, non-leaky system. A minimum no flow time duration (T1) can be established for a properly-maintained fluid-distribution system. If the no flow condition never meets or exceeds this time duration (T1), a person skilled in the art would conclude that a leak exists somewhere in the system.

An exemplary system, such as a domestic household might have, but is not limited to, a cyclical period of 24 hours with a null usage period of 6 hours. It is likely that searching for a no flow period of 1 hour within the cyclical period would be effective, but it would also be recognized by a person skilled in the art that the length of the anticipated no flow period could be reduced to minimize false positives or increased to avoid false negatives.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment(s), in which:

FIG. 2 is a block diagram of a first preferred embodiment of the present invention coupled with a fluid distribution system, whereby a first preferred embodiment of the invented method of detection of a no flow state of time duration T1 within the longer time duration window T2 is monitored for;

FIG. 9 is a representation of a collection of water flow data collected at a water input point of a fluid distribution system by a prior art flow monitoring system in accordance with the second alternate preferred embodiment of the invented method;

FIG. 12 is a block diagram of an alert message as generated by the aspects of the invented method of FIG. 8.

DETAILED DESCRIPTION

Figure 1:
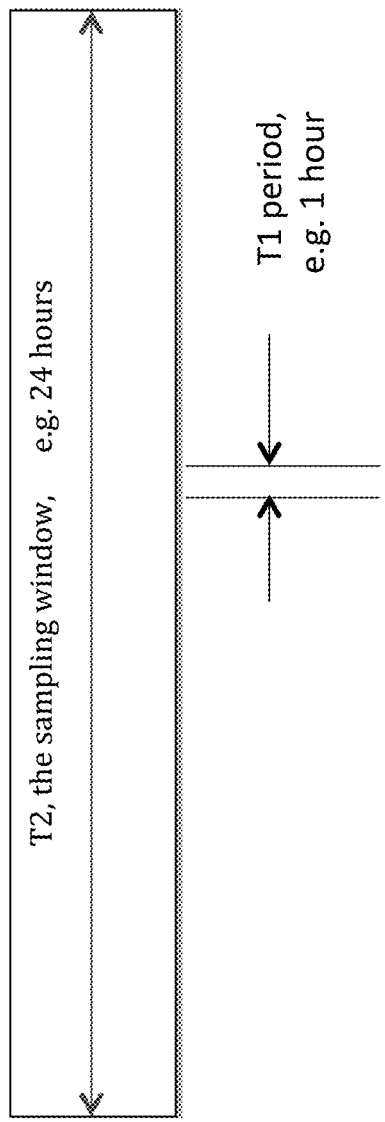
FIG. 1 is a timing diagram indicating the relationship between an exemplary prespecified and/or configurable time duration of T1 and an exemplary prespecified and/or configurable time duration window T2 are both presented, wherein the time duration T1 is of lesser duration than the time duration window T2.

It is understood that word "exemplary" is used herein to mean "serving as an example, instance, or illustration." Any aspect described herein as "exemplary" is not necessarily to be construed as exclusive, preferred or advantageous over other aspects. Referring now generally to the Figures and particularly to FIG. 1. FIG. 1 is a timing diagram indicating the relationship between an exemplary prespecified and/or configurable time duration of T1 and an exemplary prespecified and/or configurable time duration window T2. In accordance with the first preferred embodiment of the invented method (hereinafter, "the first method") and the second alternate preferred embodiment of the invented method (hereinafter, "the second method"), of the invented methods, the time duration of T1 is of lesser duration than the time duration window T2. The first method attempts to determine if no fluid flow is detected for the time duration T1 within the time duration window T2, whereby when an instance of no fluid flow continuing for the time duration T1 is not detected within the time duration window T2, a leak indication, or fault condition, is reported in accordance with the first method.

Figure 2:
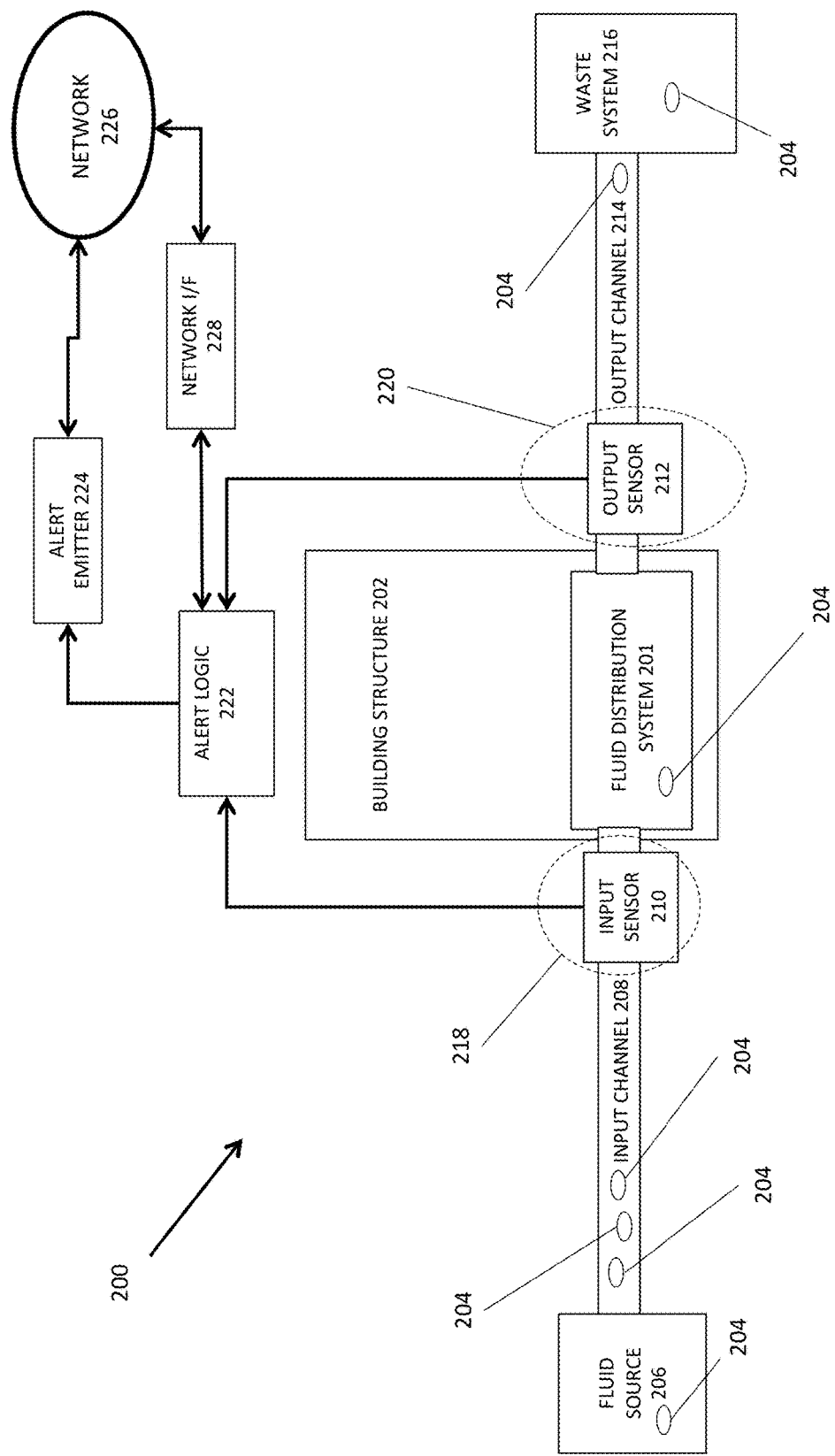

Referring now generally to the Figures and particularly to FIG. 2. FIG. 2 presents a first preferred embodiment of the invented system 200 (hereinafter, "the first system"), by which the first method may be implemented. A fluid distribution system 201 is optionally housed in a building structure 202. A volume of fluid 204 is received into the fluid distribution system 201 from a fluid source 206 using the input channel 208. Fluid flow is detected and optionally measured into the fluid distribution system 201 by an input fluid flow sensor 210. Alternatively fluid flow can be detected on the output of the fluid distribution system 201 by an output fluid flow sensor 212 when the fluid 204 flows through an output channel 214 to a waste system 216. It is understood that the output channel 214 and/or the input channel 208 may be or comprise suitable pipes or tubing known in the art.

The input fluid flow sensor 210 (hereinafter, "the input sensor" 210) and/or the output fluid flow sensor 212 (hereinafter, "the output sensor" 212) may be or comprise a Part No. 1528-1523-ND™ fluid flow sensor as marketed by Digi-Key Electronics of Thief River Falls, Minn.

The input sensor 210 is coupled with the input channel 208 at an input access point 218 of the fluid distribution system 201 and is positioned to detect the flow and/or the volume of fluid 204 flowing through the input channel 208 and into the fluid distribution system 201. The output sensor 212 is coupled with the output channel 214 at an output access point 220 and is positioned to detect the flow and/or volume of fluid 204 flowing through the output channel 214 and into the waste system 216.

The input sensor 210 and/or the output sensor 212 are communicatively coupled with an alert logic 222 (hereinafter, "the logic" 222). The input sensor 210 and the output sensor 212 each preferably inform the logic 222 of detections of flow and no flow states respectively of the input channel 208 and of the output channel 214. The logic 222 is communicatively coupled with and/or controls or directs an alert sensory emitter 224 (hereinafter, "the alert emitter" 224). The alert emitter 224 is configured to issue a visible or audible signal that is emitted when the logic 222 determines that a leak of the fluid distribution system 201 is indicated. Optional and alternative elements of the alert emitter 224 are discussed and presented in FIG. 5.

Optionally, alternatively or additionally, the logic 222 is communicatively connected to an electronics communications network 226, communicating an alert or a message comprising or within an electronic text message consisting of an email, an SMS text message and/or a digitized electronic text message. The electronics communications network 226 (hereinafter, "the network 226") can be wired or wireless and includes any suitable network known in the art that is capable of sending and/or receiving commands and/or data, to include a telephony network, a wireless telephony network, a wireless electronic communications network, and/or the Internet.

Further optionally, alternatively or additionally, the logic 222 is communicatively coupled with and/or controls or directs a network interface module 228. The network interface module 228 is bidirectionally communicatively connected with the electronics communications network 226. In certain alternate preferred embodiments of the first system 200, the logic 222, alert emitter 224 and/or the network interface module 228 may be comprised in part or in total within a unified device (not shown).

In certain other alternate preferred embodiments of the first system 200, the first system 200, the logic 222, alert emitter 224 and/or the network interface module 228 may comprise or be comprised in part or in total within a device (not shown) that includes a Feather HUZZAH™ microprocessor with an ESP8266 WiFi option as marketed by Adafruit Industries, LLC of New York, N.Y.

Figure 3:
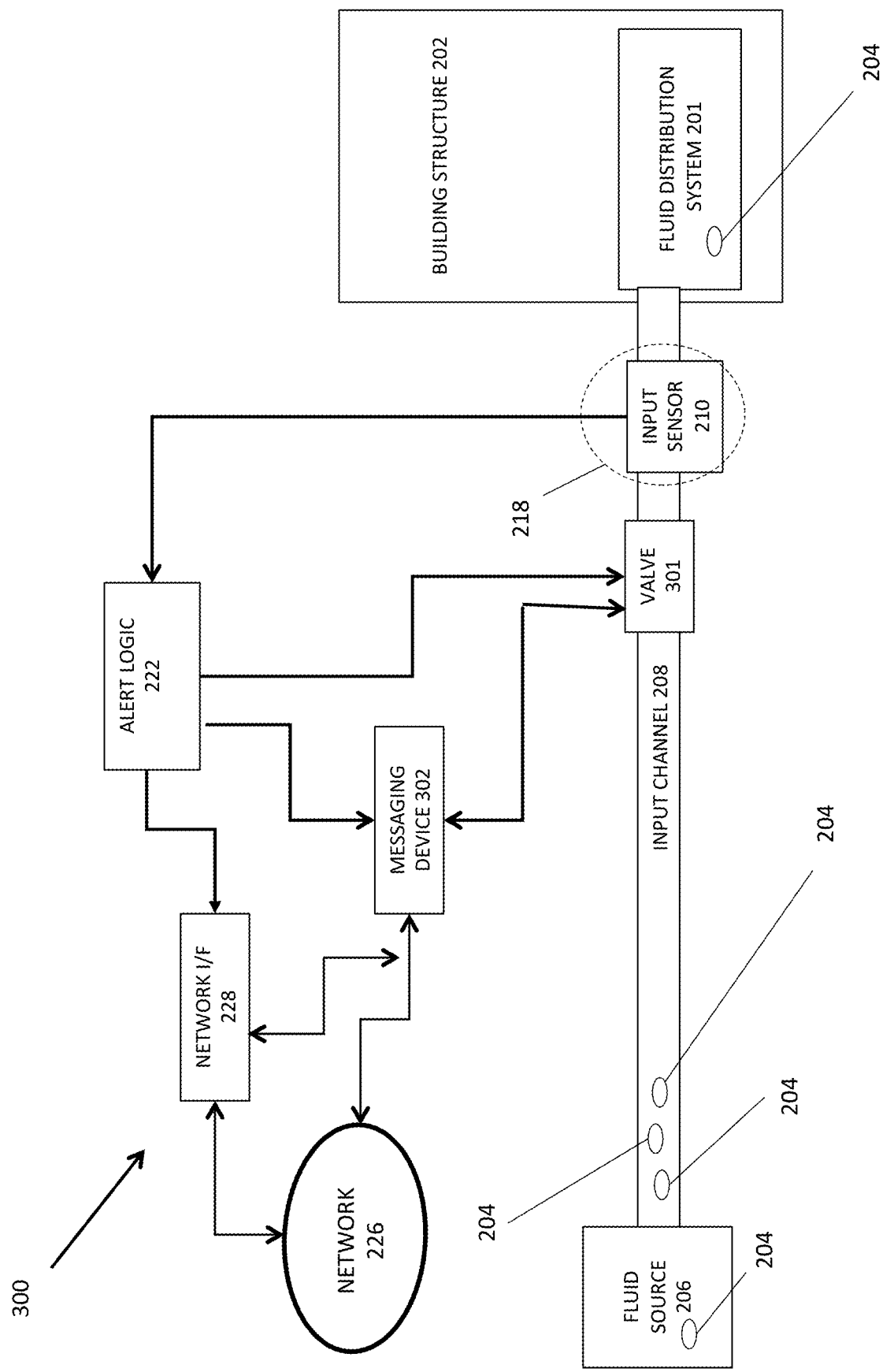
FIG. 3 is a block diagram of the first preferred embodiment of the present invention of FIG. 2 further comprising an optional controllable valve and an optional messaging device.

Referring now generally to the Figures and particularly to FIG. 3, a first alternate preferred embodiment of the present invention 300 (hereinafter, "the second system" 300) is presented. The second system 300 optionally includes a controllable valve 301 that is coupled inline with the input channel 208 and is positioned to enable controlled closing and enabling of the input channel 208 as directed by the logic 222 and/or by a messaging device 302 to control the flow of fluid 204 from the fluid source 206 into the fluid distribution system 201 within the building structure 202.

The controllable valve 301 may be or comprise a ELK-WSV2™ controllable fluid flow valve as marketed by ELK Products Corporation of Hildebran, N.C.

It is further understood that the messaging device 302 may comprise or be comprised in part or in total within (a.) a device (not shown) that includes a Feather HUZZAH™ microprocessor with an ESP8266 WiFi option as marketed by Adafruit Industries, LLC of New York, N.Y., (b.) a Raspberry PI Zero W consisting of or comprising bundled communications and computational hardware and software modules as marketed by Adafruit Industries, LLC. of New York City, N.Y.; (c.) other suitable electronic device product known in the art and comprising bundled communications and computational hardware and software modules that enable wifi-compliant communications, SMS messaging, email, voice, and or digitized textual communications.

Fluid flow is detected at the input access point 218 using the input sensor 210. The messaging device 302 can receive commands from the network interface 228. Alternatively, commands can be sent over the network interface 228 to the logic 222. The network interface 228 can be wired or wireless and includes any network that is capable of sending and/or receiving commands and data. Valve 301 can be operated directly by the alert logic 222 or alternatively by the messaging device 302 directly or indirectly.

Figure 4:
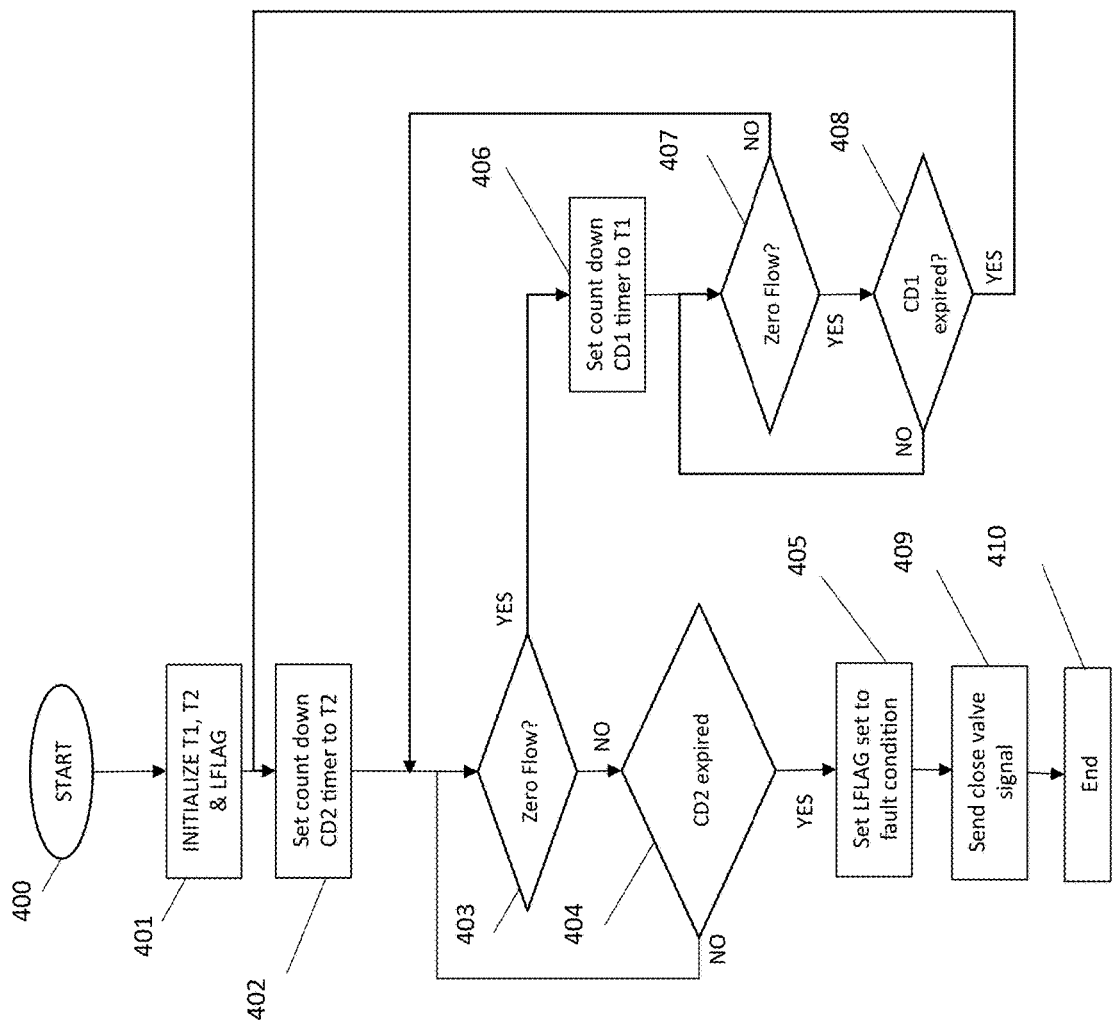
FIG. 4 is a flowchart of an exemplary application of the first invented method.

Referring now generally to the Figures and particularly to FIG. 4. FIG. 4 is a flow chart of the first method executed by the logic 222 and that is enabled by the input sensor 210 and the alert emitter 224. In step 400, the logic 222 is energized, and in step 401 the logic 222 initializes (a.) a T1 counter CD1 variable to an initial start value; (b.) a T2 counter CD2 variable to an initial start value; and (c.) a leak flag LFLAG to a non fault condition value. In step 402 a countdown timer is initialized to the value of T2 and started. In step 403 the fluid flow at the input sensor 210 determines if fluid is flowing into the fluid distribution system 201 through the input access point 218. If the input sensor 210 does not currently detect a state of zero fluid flow, then in step 404 the CD2 countdown timer is evaluated. If the countdown timer CD2 has completed its countdown, then at 405 a fault condition is set by setting the LFLAG indicating the fault condition. In the alternate negative outcome of 404, the logic returns to decision block 403 to test for zero flow condition again. In step 407 the sensor also determines if there is zero flow. If the zero flow condition is sustained until timer CD1 expires, then in step 408 the expired timer resets the T2 counter in block 402 and no LFLAG fault signal is reported.

In an alternate positive outcome of 403, when a zero flow condition is detected by input sensor 210, then a CD1 countdown timer is set to the value of T1 and started at block 406. Decision block 407 tests for a zero flow condition through input sensor 210, and if none is found, then the logic returns to decision block 403 to continue monitoring for zero flow at 403 and testing for the expiration of the T2 timer at 404.

In an alternate positive outcome of decision block 407, the logic continues to block 408 and tests for the expiration of countdown timer CD1. If the CD1 countdown timer has not expired then the logic loops back to decision block 407 to test again for zero flow.

In an alternate positive outcome of decision block 408, the CD1 countdown timer is determined to have expired, and the logic has confirmed that for the period of the time window T2, there existed a period of zero fluid flow for a time period of T1 and so no leak has been detected. The logic then returns to step 402 where the CD2 countdown timer, is again set to the initial value of T2 and the monitoring is restarted for the next time window.

Optionally, alternatively or additionally, the setting of the LFLAG to a fault condition indication in block 405 can direct the logic 222 in block 409 to signal the valve 301 to close and impede or halt flow of the fluid 204 through the input channel 208. Further optionally, alternatively or additionally, the logic 222 in block 409 may signal or send a message or command over the network interface 228 and the network 226 directly or indirectly to the messaging device 302. The messaging device 302 may then send a signal to valve 301 to close and impede or halt flow of the fluid 204 through the input channel 208.

Figure 5:
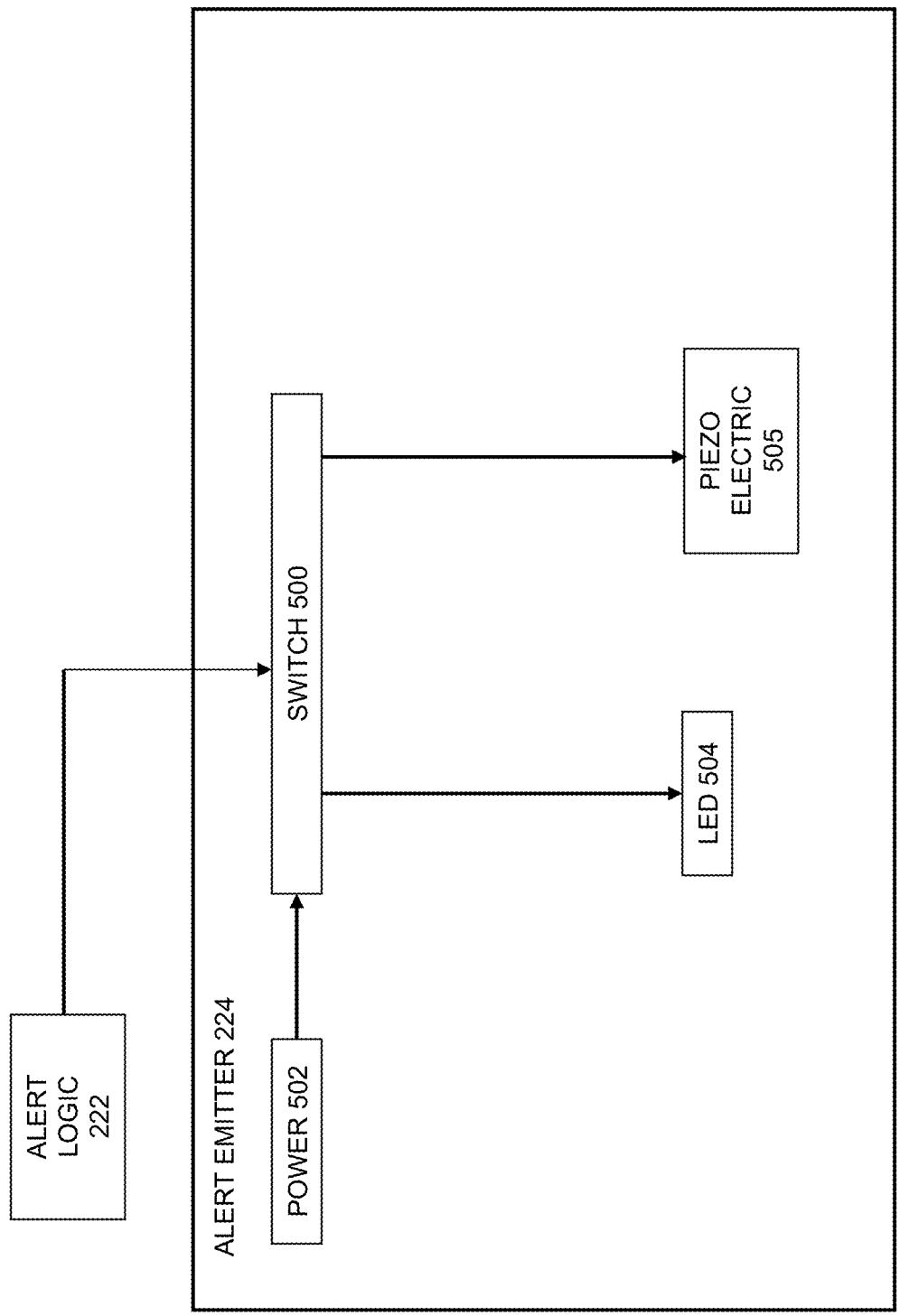
FIG. 5 is a block diagram of the alert emitter of FIG. 2.

Referring now generally to the Figures and particularly to FIG. 5. FIG. 5 is a block diagram of the alert emitter 224. The alert emitter 224 receives a signal or instruction from the logic 222 at an internal switch bus 500 that indicates that a fault condition finding has been determined in accordance with the first method. The internal switch bus 500 is coupled with an electrical power source 502 and selectively delivers electrical power from the power source 502 to a light emitting diode 504, and/or a piezo-electric sound alarm device 505. The piezo-electric sound alarm device 505 could be or comprise Part number AT 1750-TFL-LW95-R™ audio energy emitting device marketed by PUI Audio of Dayton, Ohio. It is understood that the electrical power source 502 may be or comprise an internal battery and/or coupled with an external electrical power source (not shown) from which the electrical power source 502 draws electrical energy.

Figure 6:
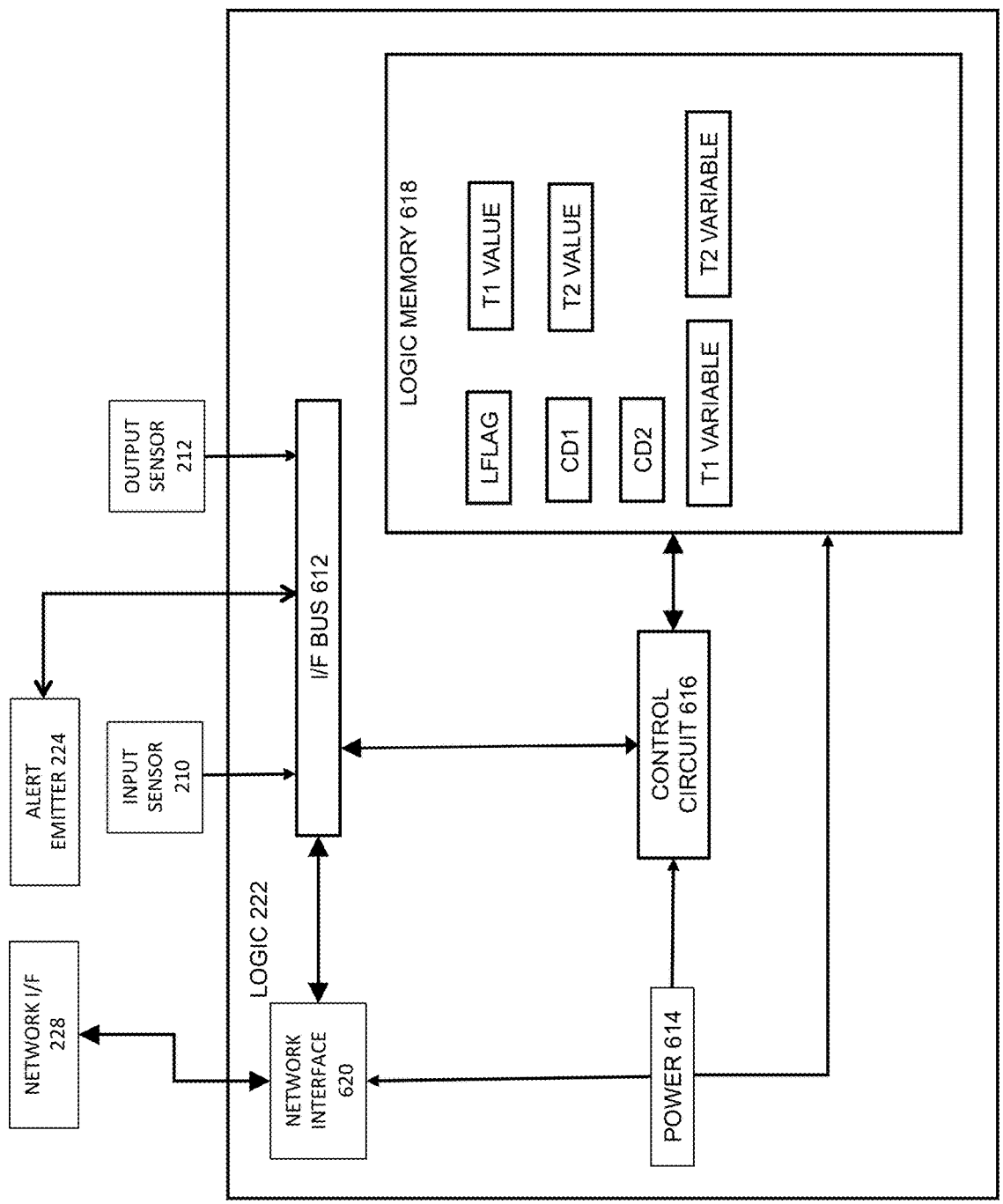
FIG. 6 is a block diagram of the alert logic of FIG. 2 and FIG. 3.

Referring now generally to the Figures and particularly to FIG. 6. FIG. 6 is a block diagram of the logic 222. The control circuit 616, logical memory 618 and the network interface 620 are supplied with power from power source 614. The control circuit 616 is communicatively coupled to the network interface 620, the input sensor 210, the alert emitter 224 and the output sensor 212 with an interface bus (I/F BUS) 612. The network interface 620 is communicatively coupled to the network 228. The control circuit 616 is communicatively coupled to the logic memory 618 with an internal bus.

The control circuit 616 may be or comprise preprogrammed logic, reprogrammable logic circuitry, configurable logic circuitry and/or reconfigurable logic circuitry that instruct and direct the system in the aspects and steps of the method of the present invention.

The logic memory 618 includes and stores various values and information, to include the fault flag value FLAG, the T1 value, the T2 value, the T1 variable, the T2 variable, the counter CD1 and the counter CD2.

Figure 7:
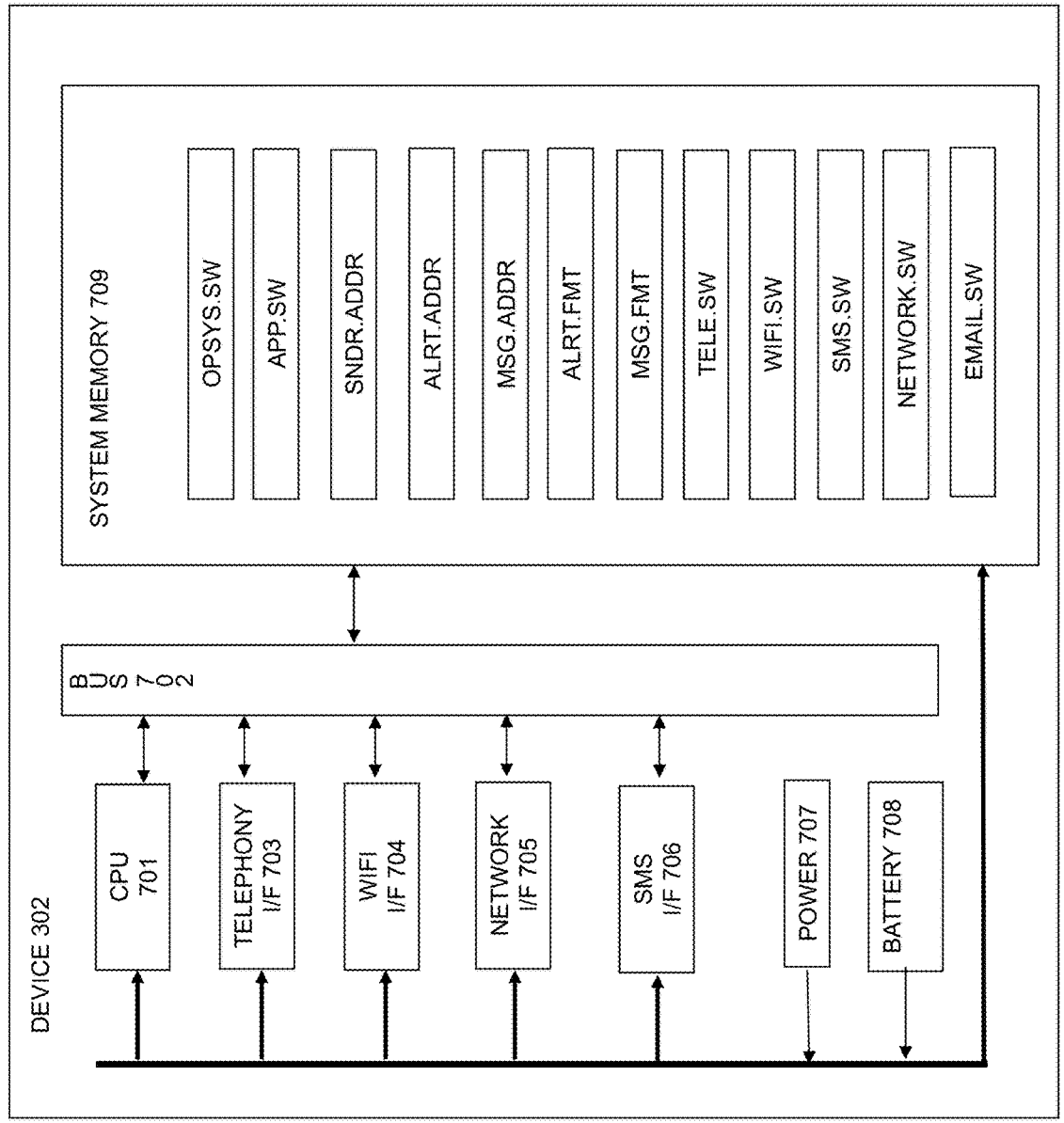
FIG. 7 is a block diagram of an alternate embodiment of the messaging device of FIG. 3.

Referring now generally to the Figures and particularly to FIG. 7, FIG. 7 is a block diagram of an alternate embodiment of the messaging device 302.

A central processing unit 701 (hereinafter, "CPU" 701) is bidirectionally communicatively coupled with a communications bus 702 (hereinafter, "bus" 702). A telephony interface circuitry 703 enables the CPU 701 to bidirectionally communicatively couple with a telephone network and communicate via wireless radio wave communications in accordance with wireless telephony standards. A WiFi interface circuitry 704 enables the CPU 701 to bidirectionally communicatively couple with the network 226 and optionally the logic 222 in accordance with the WiFi™ for wireless local area networking standard as maintained by the WiFi Alliance of Austin, Tex. A network interface circuitry 705 enables the CPU 701 to bidirectionally communicatively couple with a wired network 226 and optionally the logic 222. An SMS interface 706 enables the CPU 701 to bidirectionally communicatively couple with the network 226 and optionally the logic 222 in accordance with one or more Short Message Service text messaging service standards.

An electrical energy source 707 and/or an electrical energy storage battery 708 are coupled with and provide electrical energy to the CPU 701, the telephony interface 703, the WIFI interface 704, the network interface 705, the SMS interface 706 and system memory 709. The system memory 709 retains and applies an operating system software OPSYS.SW and an applications software APP.SW that directs and instructs the messaging device to further direct and instruct the second system 300 in practicing aspects and steps of the invented method.

The software OPSYS.SW of the messaging device 302 may be selected from freely available, open source and/or commercially available operating system software, to include but not limited to LINUX™ or UNIX™ or derivative operating system, such as the DEBIAN™ operating system software as provided by Software in the Public Interest, Inc. of Indianapolis, Ind.; or other suitable operating system known in the art.

The system memory 709 optionally and additionally retains and applies an alert message format ALRT.FMT for use in structuring and transmitting alert messages, an message format MSG.FMT for use in structuring and transmitting messages, a network sender address SNDR.ADDR for use with alert messages and messages, an alert network destination address ALRT.ADDR for use with alert messaging, and a message network destination address MSG.ADDR for use with alert messaging, The system memory 709 further optionally and additionally retains and applies (1.) a telephony messaging software TELE.SW that enables the messaging device 302 to send and receive audio and textual messages through a telephony network by means of the telephony interface circuitry 703; (2.) a WiFi software WIFI.SW that enables the messaging device 302 to send and receive digitized messages through the network 226 by means of the WiFi interface circuitry 704; (3.) a network software NETWORK.SW that enables the messaging device 302 to send and receive digitized messages through the network 226 by means of the network interface circuitry 705; (4.) a texting software SMS.SW that enables the messaging device 302 to send and receive digitized messages through the network 226 by means of the SMS interface circuitry 706; and (5.) an email application software EMAIL.SW that enables formatting and transmission of email messages by means of the network interface circuitry 705 and the network 226.

It is understood that the telephony messaging software TELE.SW, the WiFi software WIFI.SW, the network software NETWORK.SW, the texting software SMS.SW and the email application software EMAIL.SW are configured to (1.) apply the alert message format ALRT.FMT for use in structuring and transmitting alert messages, (2.) apply the message format MSG.FMT for use in structuring and transmitting messages, (3.) apply the network sender address SNDR.ADDR to indicate the sender address alert messages and message, (4.) apply the alert network destination address ALRT.ADDR for use as a destination address alert messaging, and (5.) apply the message network destination address MSG.ADDR for use with alert messaging as a destination address.

Figure 8:
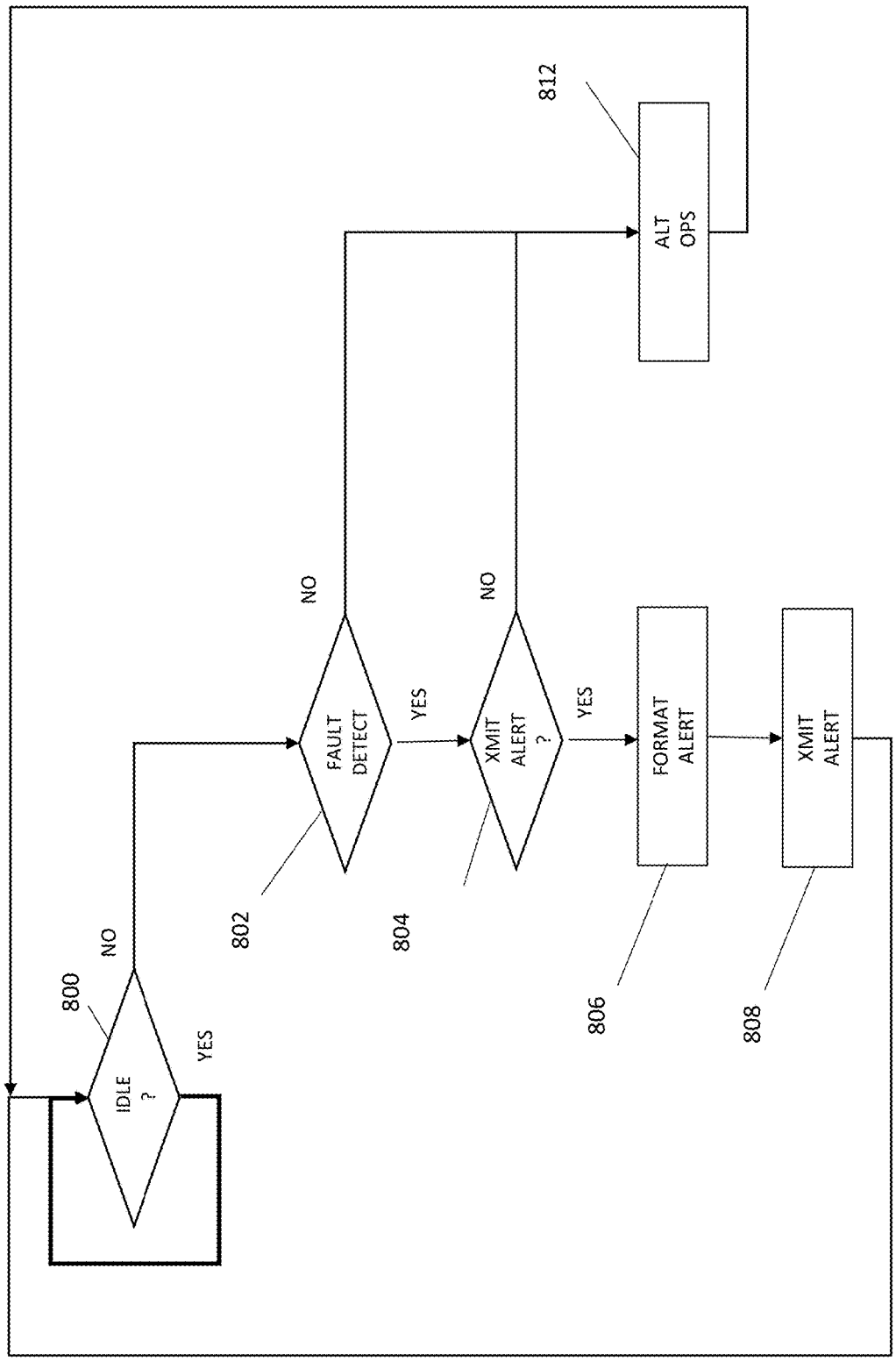
FIG. 8 is a flow chart of an optional operational method of the messaging device of FIG. 3.

Referring now generally to the Figures and particularly to FIG. 8, FIG. 8 is a flowchart of optional operations of the messaging device 302 that enable and/or instantiate certain steps and aspects of the invented method. In step 800 the messaging device 302 is looping until a message or alert is received from logic 222. When a message or an alert is received from logic 222 the request is evaluated in step 802. If the request was not for a fault, then the logic continues to some alternate operation(s) and then returns to the decision block 800 to the idle loop. In the alternate positive outcome of decision block 802, the request is evaluated at decision block 802 to see if the request was to transmit an alert. If the decision is negative, then the request continues to some alternate operation(s) and then returns back to decision block 800 to the idle loop. In the alternative positive outcome of decision block 804 the messaging device 302 formats a message at step 806 and sends the message at step 808. When the messaging device 302 determines in step 804 to initiate generation of an alert message AMSG, the messaging device 302 in optional step 806 applies at least one of the messaging software modules TELE.SW, WIFI.SW, SMS.SW & EMAIL. SW to format an alert message AMSG in accordance with the alert format ALRT.FMT.

The messaging device 302 proceeds from step 806 and to step 808 and to transmit the alert message formatted in step 806 via one of the interface circuitries 703-706 as directed by the software module TELE.SW, WIFI.SW, NETWORK.SW & SMS.SW selected in step 806. The messaging device 302 proceeds from step 808 to return to step 800.

Referring now generally to the Figures and particularly to FIG. 9. FIG. 9 is a representation of a collection 901 of water flow data (herein after, "prior art data" 901) collected by a prior art water flow sensor 210 positioned at a water input access point 218 of a fluid distribution system 201 of FIG. 2. The method of FIG. 9 is enabled by a third invented system 1000 and an alternate input water flow volume sensor 1002. The alternate input water flow volume sensor 1002 is preferably bi-directionally communicatively coupled with a prior art electronic communications network 1003.

The prior art data 901 represents a summation of total volume of water, i.e., fluid 204, determined by the prior art water flow input sensor 210, to have flowed into the fluid distribution system 201, wherein each data point 2A-2AH contains a time, date, and a flow volume counter reading. Time period flow volume is calculated, according to the first invented method, by subtracting the flow volume counter reading of the next earlier data point from the flow volume counter of the selected instant data point within a moving prespecified and/or configurable time period T2. When two adjacent data points have an identical flow volume counter reading, an occurrence of no flow of fluid through the fluid input point access 218 is indicated to have been maintained between the two date-time points of these two adjacent data points. When a sequence of contiguous data points have an identical flow volume counter reading for a prespecified and/or configurable elapsed time period T1, within a pre-specified and/or configurable moving time window T2, where T1 is less than T2, an occurrence of no flow of fluid through the input point 212 is indicated to have been maintained. A user of the first invented method may thus determine an indicated time duration of occurrence of a no flow state in part by prior art means.

According to the second method, a user will determine if the indicated time duration of a no flow state as determined by the information provided in the prior art data 901, is greater or equal to a pre-specified and/or configurable time duration T1 and is within the second prespecified and/or configurable moving time window T2. When the indicated time duration of a no flow state of the fluid distribution system 201 is of greater or equal value to the duration of the time T1 within the moving time window T2, the first invented method generates a determination that there is no indication of a leak in the fluid distribution system 201. Conversely, when the indicated time duration of a no flow state of the fluid distribution system 201 is shorter than the time duration T1 or does not exist within the moving time window T2, the first invented method generates a determination that there is an indication of a leak in the fluid distribution system 201.

It is understood that the prior art data 901 may be generated by, and is available from, existing information technology operations of numerous water provision utility corporations and entities, to include the Pleasanton Water District of the City of Pleasanton, Calif. It is further understood that an embodiment of the prior art input sensor 210 that generates the prior art flow data 901 is currently employed by water provision utility corporations and entities, to include the Pleasanton Water District of the City of Pleasanton, Calif.

Figure 10:
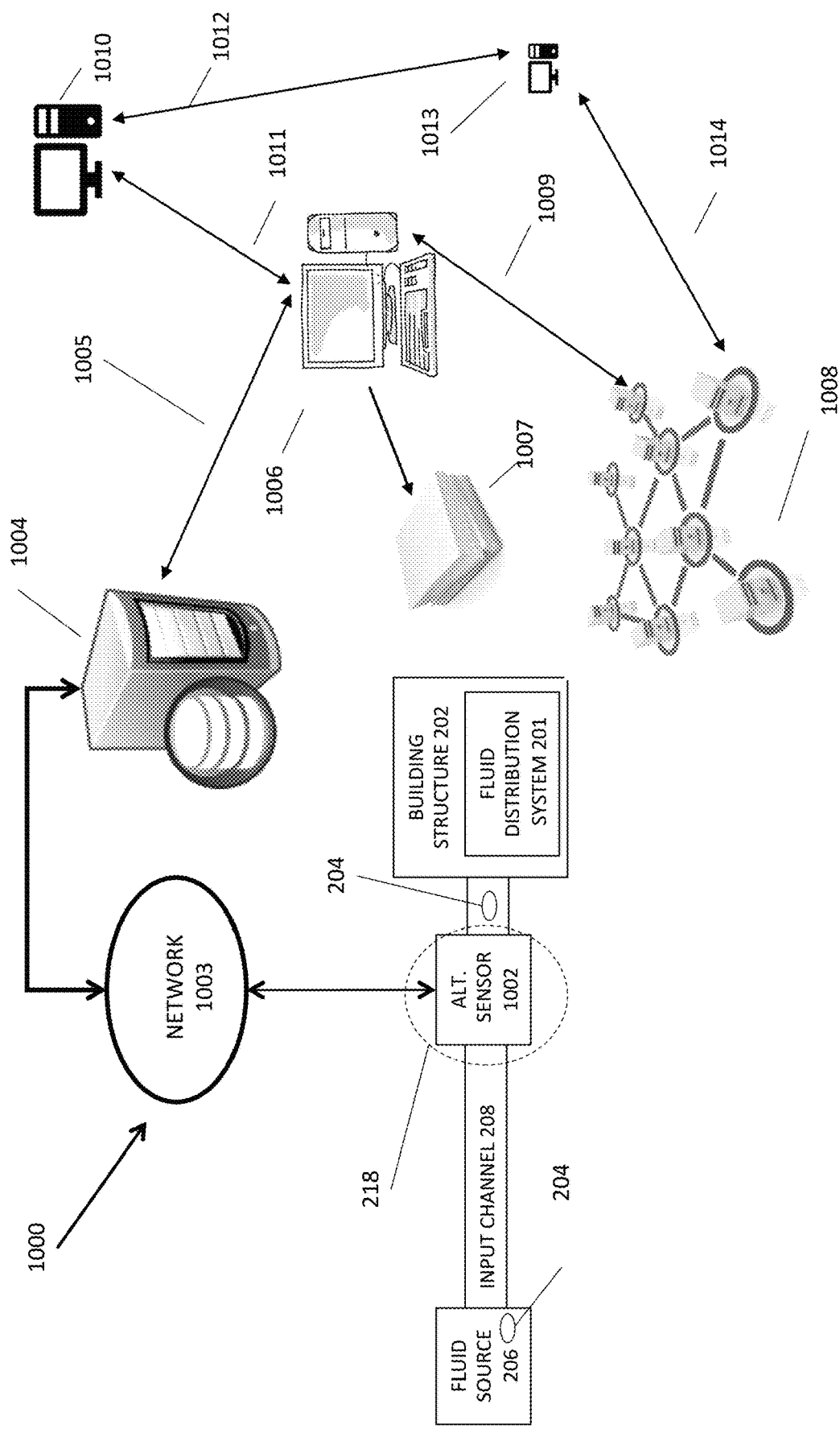
FIG. 10 is a block diagram of a second exemplary invented system that generates and analyzes the data represented in FIG. 9 in the second alternate preferred embodiment of the invented method.

Referring now generally to the Figures, and particularly to FIG. 10. FIG. 10 the exemplary third invented system 1000 that includes the alternate input water flow volume sensor 1002. The third invented system 1000 enables a third alternate preferred embodiment of the invented method in gathering and analyzing the data 901. The alternate input water flow volume sensor 1002 measures water flow via the input channel 208 from the fluid source 206 and into the fluid distribution system 201 and provides a cumulative water flow volume value of water flow volume detected over optionally the time period T2 or alternately or additionally cumulatively measures total water flow volume detected during a briefer or a longer time window. The alternate input water flow volume sensor 1002 mat be or comprise a HYDRUS™ ULTRASONIC METER water flow volume sensor marketed by Diehl Stiftung & Co. KG (Germany) of Nurnberg, Federal Republic of Germany, or other suitable water flow sensor that measures water flow and cumulatively maintains a value of total water flow detected over a time period at least greater than T1.

Data 901 is gathered by prior art flow sensors/counters 210 that measure flow of fluids 204 into the fluid distribution system 201 through the input channel 208. Fluid flow counter values are sent over the prior art wireless and/or wired electronic communications network 1003 to a central server 1004. The flow counter values are stored on the central server 1004.

The prior art communications network 1003 can be wired or wireless and includes any suitable network known in the art that is capable of sending and/or receiving commands and/or data, to include a telephony network, a wireless telephony network, a wireless electronic communications network, and/or the Internet.

The central server 1004 may be or comprise a hardware and software bundled computational device product, such as (1.) a 7520 PRECISION MOBILE WORKSTATION™ portable computer as marketed by DELL of Austin, Tex., or (2.) other suitable computational device product known in the art and comprising hardware and software modules running an operating system such as WINDOWS™ software operating system as marketed by Microsoft Corporation of Redmond, Wash., IOS™ operating system as marketed by Apple, Inc., or LINUX™ operating system as marketed by Linux.org of San Francisco, Calif. The flow sensor/counter data 901 could be stored in a database such as MySQL, Oracle or Microsoft SQL as hosted by the central server 1004. The flow/counter data 901 could be queried and analyzed from a workstation 1006 over a communication link 1005 by the workstation 1006. The workstation 1006 may be or comprise a hardware and software bundled computational device product, such as (1.) a MACBOOK™ personal portable computer marketed by Apple Inc. of Cupertino, Calif., (2.) a 7520 PRECISION MOBILE WORKSTATION™ portable computer as marketed by DELL of Austin, Tex., or (3.) other suitable computational device product known in the art and comprising hardware and software modules running an operating system such as WINDOWS™ software operating system as marketed by Microsoft Corporation of Redmond, Wash., IOS™ operating system as marketed by Apple, Inc., or LINUX™ operating system as marketed by Linux.org of San Francisco, Calif.

The communication link 1005 could be any wired or wireless network technologies including Ethernet or IEE802 wifi. Potential leak conditions could be communicated by printed or online reports 1007. Potential leak conditions could alternatively be reported over the internet 1008 using one or more electronics communications networks 1009 and/or by using voice or SMS gateways 1010 using one or more electronics communications networks 1011.

One or more voice or SMS gateways 1010 may be or comprise (1.) a 7520 PRECISION MOBILE WORKSTATION™ portable computer as marketed by DELL of Austin, Tex., or (2.) other suitable computational device product known in the art and comprising hardware and software modules running an operating system such as WINDOWS™ software operating system as marketed by Microsoft Corporation of Redmond, Wash., IOS™ operating system as marketed by Apple, Inc., or LINUX™ operating system as marketed by Linux.org of San Francisco, Calif.

Leak condition alerts and messages could be received over network link 1012 by a smartphone 1013, such as an IPHONE™ smartphone as marketed by Apple, Inc. of Cupertino, Calif., or an ANDROID™ smartphone as marketed by Alphabet Inc. of Mountain View, Calif., or other suitable smartphone product known in the art. The network link 1012 may be or comprise any suitable cellphone/mobile network or wifi network known in the art.

The smartphone 1013 may alternatively receive alerts over the internet 1008 over electronics link 1014 sent from the workstation 1006. The network link 1014 may be or comprise any suitable cellphone/mobile network or wifi network known in the art.

Figure 11:
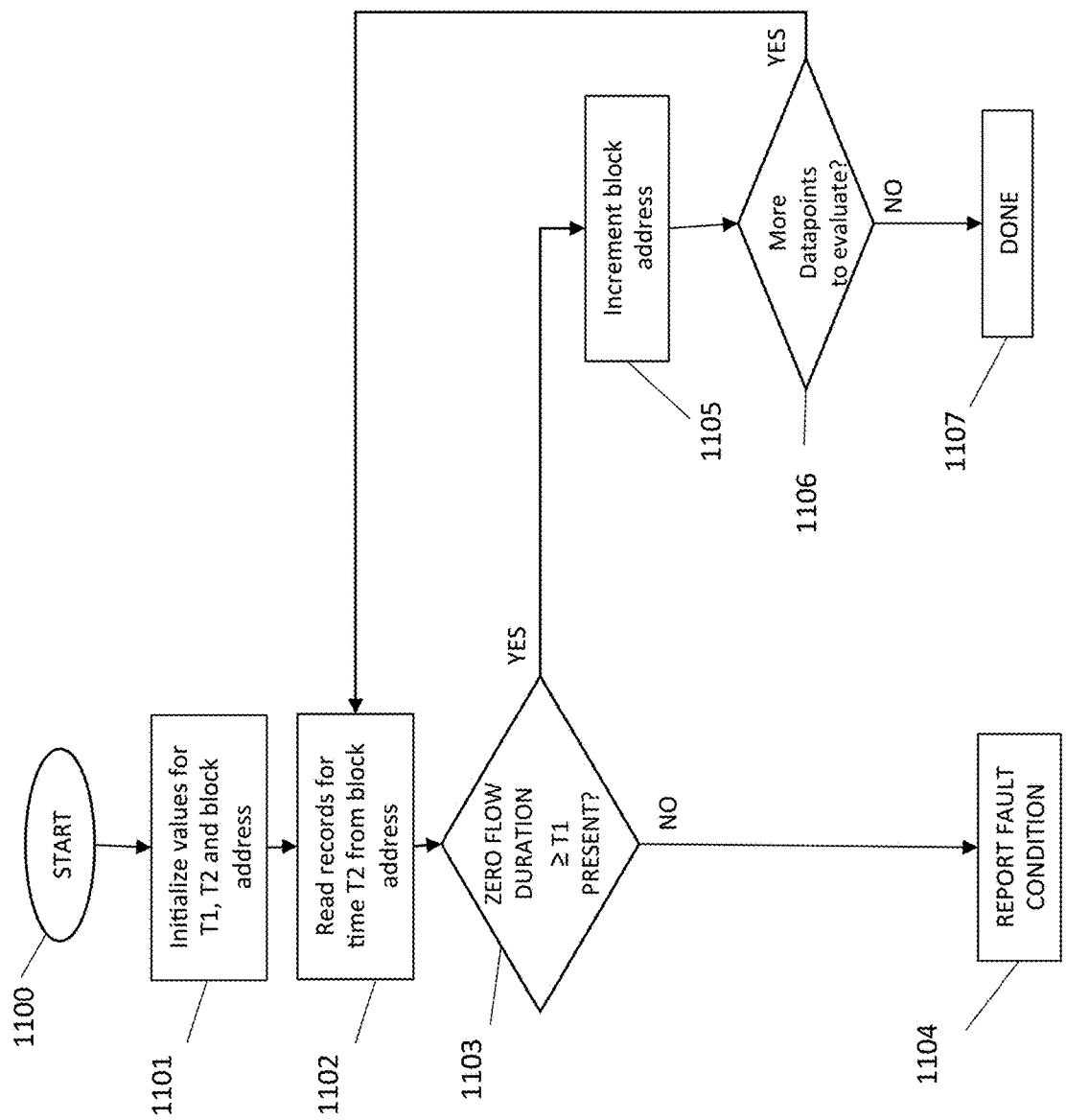
FIG. 11 is a flow chart of possible operations of a third alternate preferred embodiment of the invented method that are enabled by the by the second exemplary alternate preferred embodiment of the invented system of FIG. 10 to capture and analyze the data represented in FIG. 9.

Referring now generally to the Figures, and particularly to FIG. 11, FIG. 11 is a flowchart of an exemplary application of the third alternate preferred embodiment of the invented method to the data of FIG. 9 using the exemplary system of FIG. 10. In step 1100 the second invented process is initiated by a user. It is understood that the user may be a human user and/or an information technology system in singularity of in combination. In step 1101, T1 and T2 variables are set respectively within the address space of a computer program from separate prespecified and/or configurable values. A block address value is also set which identifies a first datapoint 2J as presented in FIG. 9 of the time window T2. In step 1102, datapoint records are read from the acquired data as presented in FIG. 9, starting from the block address identified by the block address value initialized in step 1101, of the time window set for T2 in step 1101. In step 1103, the datapoints 2J-2AG are evaluated for zero flow duration periods, greater than or equal to the value of T1 within the time window T2. If there is a period of zero flow duration period equal to or greater than T1, during the time window T2, the block address value is incremented in step 1105. In step 1106, the system evaluates if there are more records to read and evaluate. If there more records to read and evaluate, steps 1105, 1106, 1102 and 1103 are repeated until there are no more datapoints records to be read, as determined by step 1106. An alternate negative outcome of step 1103, when there has been no period of zero flow found within the time window T2, a fault condition indicating a leak is set in step 1104. The fault condition is reported, depending on the system or person evaluating the fluid flow data. If the analysis is performed using an IT system/computer program, an error message would be generated by but not limited to, printed output, computer display, email, SMS message, voice message or smart phone application. If the analysis is performed by a human, the error message would be generated by but not limited to written reports, voice or human generated electronic reports or messages. An alternate negative outcome of step 1106 terminates the instant cycle of analysis of the second method.

Referring now generally to the Figures, and particularly to FIG. 12, FIG. 12 is a block diagram of the alert message AMSG formatted in step 806 and transmitted in step 808 of the method of FIG. 8. The alert message AMSG includes an addressee network address ADDRESS.ADDR of a communications-enabled device (not shown) addressable via the network 226; an optional sender network address SENDER.ADDR of that identifies the messaging device 302; optionally a leak flag LEAK.FLG that indicates that a leak indication had been generated by the first invented system 200; and optionally additional information DATA as input into the alert message AMSG in step 806.

It is understood that the addressee network address ADDRESS.ADDR may be or comprise the alert network destination address ALRT.ADDR for use as a destination address for alert messaging when the alert message AMSG comprises leak flag LEAK.FLG. It is understood that the addressee network address ADDRESS.ADDR may be or comprise the message network destination address MSG.ADDR for use as a destination address for alert messaging when the alert message AMSG comprises additional information DATA.

The alert format ALRT.FMT may be used by the messaging device 302 in step 806 in formatting the alert message AMSG not containing additional information DATA and the message format MSG.FMT may be used by the messaging device 302 in step 806 in formatting the alert message AMSG when containing additional information DATA.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. A method of detecting an unintended leakage within a fluid distribution system, the method comprising:
   a. positioning a flow detection sensor ("the sensor") between the fluid distribution system and a source of fluid, the sensor alternatively detecting a first state of flow of fluid traversing into the fluid distribution system from the source of fluid and a second state of no flow of fluid traversing into the fluid distribution system from the source of fluid; and
   b. determining that a fault condition exists in the fluid distribution system when the sensor doesn't detect no flow at all time in a pre-specified time period T1 within a pre-specified time period T2, wherein the pre-specified time period T2 is a cyclical time period of the system to be protected and the pre-specified time period T1 is a cyclical time period within the pre-specified time period T2; and
   c. wherein T2 is asynchronous with a time of day and restarts when the sensor detects no flow at all time in the pre-specified time period T1.

2. The method of claim 1, further comprising determining that no fault condition exists when the sensor detects no flow at all time in the time period T1 within the time period T2, wherein the time period T2 is greater than the time period T1.

3. The method of claim 1, wherein the fault condition is communicated as an alert signal to a human user indicating a leakage of fluid from the fluid distribution system.

4. The method of claim 3, wherein the sensor is communicatively coupled with a sound energy emission device and the alert signal comprises a sound energy emission audible to the human user as emitted from the sound energy emission device.

5. The method of claim 3, wherein the sensor is communicatively coupled with a light energy emission device and the alert signal comprises a light energy visible to the human user as emitted from the light energy emission device.

6. The method of claim 3, wherein the sensor is communicatively coupled with a means to communicate the alert signal via a radio wave transmission.

7. The method of claim 1, wherein the fault condition is communicated as an alert message to a human user indicating a leakage of fluid from the fluid distribution system.

8. The method of claim 7, wherein the sensor is communicatively coupled with a means to communicate the alert message using a cellular telephony network.

9. The method of claim 8, wherein the sensor is communicatively coupled with a means to communicate the alert message using a cellular telephone via the telephony network.

10. The method of claim 8, wherein the alert message is selected from the group of electronic text messages consisting of an email, an SMS text message and a digitized electronic text message.

11. The method of claim 1, wherein the sensor is communicatively coupled with a means to communicate the fault condition using a computer network.

12. The method of claim 11, further comprising communicating the fault condition as an alert message to a human user indicating a leakage of fluid from the fluid distribution system, wherein the alert message is selected from the group of electronic text messages consisting of an email, an SMS text message and a digitized electronically text message.

13. The method of claim 1, further comprising:
   a. disposing a control valve between the fluid distribution system and the fluid source, the control valve alternately enabling and disabling flow of the fluid from the fluid source to the fluid distribution system; and
   b. upon a failure of a detection of a no flow condition for at least the time duration T1 during the time period T2, directing the control valve to disable flow of the fluid from the fluid source into the fluid distribution system.

14. The method of claim 13, wherein the control valve comprises a control element selected from the control element group consisting of an electromechanical means, a hydraulic actuator and a pneumatic actuator.

15. The method of claim 1, further comprising reinitiating a succeeding time period T2 every time when the sensor detects no flow at all time in the time period T1.

16. A system comprising a means for practicing the following method of detecting an unintended leakage within a fluid distribution system, the method comprising:
   a. positioning a flow detection sensor ("the sensor") between the fluid distribution system and a source of fluid, the sensor alternatively detecting a first state of flow of fluid traversing into the fluid distribution system from the source of fluid and a second state of no flow of fluid traversing into the fluid distribution system from the source of fluid; and
   b. determining that a fault condition exists in the fluid distribution system when the sensor doesn't detect no flow at all time in a pre-specified time period T1 within a pre-specified time period T2, wherein the pre-specified time period T2 is a cyclical time period of the system to be protected and the pre-specified time period T1 is a cyclical time period within the pre-specified time period T2; and
   c. wherein T2 is asynchronous with a time of day and restarts when the sensor detects a no flow at all time in the pre-specified time period Tl.

17. The device of claim 16, further comprising a means to determine that no fault condition exists when the sensor detects no flow at all time in the time period Tl within the time period T2, wherein the time period T2 is greater than the time period Tl.

18. The device of claim 16, further comprising a means to:
   a. dispose a control valve between the fluid distribution system and the fluid source, the control valve alternately enabling and disabling flow of the fluid from the fluid source to the fluid distribution system; and
   b. upon a failure of a detection of a no flow condition for at least the time duration T1 during the time period T2, direct the control valve to disable flow of the fluid from the fluid source into the fluid distribution system.

19. The device of claim 16, further comprising a means to communicate the fault condition as an alert signal to a human user indicating a leakage of fluid from the fluid distribution system.

20. The device of claim 16, further comprising a means to communicate the fault condition using a computer network.

* * * * *